United States Patent
Heider et al.

(10) Patent No.: US 6,573,005 B2
(45) Date of Patent: Jun. 3, 2003

(54) DOPED POSITIVE-ELECTRODE MATERIAL IN ELECTROCHEMICAL CELLS

(75) Inventors: Lilia Heider, Riedstadt (DE); Natascha Lotz, Erzhausen (DE); Tanja Sandner, Rüsselsheim (DE); Mathias Rothenburger, Mainz (DE); Anja Amann, Brensbach (DE)

(73) Assignee: Merck Patentgesellschaft, Darmstadt (DE)

( * ) Notice: Subject to any disclaimer, the term of this patent is extended or adjusted under 35 U.S.C. 154(b) by 189 days.

(21) Appl. No.: 09/864,874

(22) Filed: May 25, 2001

(65) Prior Publication Data

US 2002/0009640 A1 Jan. 24, 2002

(30) Foreign Application Priority Data

May 25, 2000 (DE) .......................................... 100 25 761

(51) Int. Cl.⁷ .............................................. H01M 10/24
(52) U.S. Cl. ..................................................... 429/218.1
(58) Field of Search ........................... 429/218.1, 231.7

(56) References Cited

U.S. PATENT DOCUMENTS 5,112,706 A * 5/1992 Pinsky et al. ................ 429/233
6,177,213 B1 * 1/2001 Fetcenko et al. ......... 429/218.1

* cited by examiner

*Primary Examiner*—Stephen Kalafut
*Assistant Examiner*—Monique Wills
(74) *Attorney, Agent, or Firm*—Millen, White, Zelano & Branigan, P.C.

(57) ABSTRACT

An electrode having a positive-electrode material. The positive electrode material is a tin oxide doped with F, Cl, Br, I, S, Se, Te, B, N or P anions.

10 Claims, No Drawings

DOPED POSITIVE-ELECTRODE MATERIAL IN ELECTROCHEMICAL CELLS

The invention relates to novel materials for active positive electrode material in electrochemical cells which are based on modified oxidic materials, such as, for example, tin oxides.

Lithium ion batteries are among the most promising battery systems for mobile applications. The areas of application extend from high-quality electronic equipment (for example mobile telephones and camcorders) to batteries for electrically driven motor vehicles.

These batteries consist of a negative electrode, a positive electrode, a separator and a non-aqueous electrolyte. The negative electrode is typically $Li(MnMe_z)_2O_4$, $Li(CoMe_z)O_2$, $Li(CoNi_xMe_z)O_2$ or other lithium intercalation and insertion compounds. The positive electrode is typically a lithium metal, soft and hard carbons, graphite, graphitic carbons, or other lithium intercalation and insertion compounds (i.e., compounds in which lithium has been inserted into the crystalline structure of an inorganic compound) or alloy compounds. The electrolyte is typically solutions containing lithium salts, such as $LiPF_6$, $LiBF_4$, $LiClO_4$, $LiAsF_6$, $LiCF_3SO_3$, $LiN(CF_3SO_2)_2$ or $LiC(CF_3SO_2)_3$ and mixtures there in aprotic solvents.

In the lithium ion batteries currently commercially available, carbon is employed as a positive electrode. However, this positive-electrode system has difficulties. A considerable drop in capacity occurs in this system during the 1st cycle due to irreversible incorporation of lithium into the carbon structure. In addition, the cycle stability of the carbons and graphites available is unsatisfactory. Furthermore, there is a safety aspect that kinetic limitations can cause critical parameters.

In order to improve the positive-electrode properties, new systems are being sought to replace, for example, the carbon positive electrode. The carbon materials are being replaced, for example, by oxidic materials or alloys. In *Journal of Power Sources* 75 (1998), Wolfenstine investigated the suitability of tin oxide/tin mixtures as positive-electrode material for lithium ion batteries is investigated. The irreversible loss of Li due to the formation of $Li_2O$ is said to be minimized by the preferred use of SnO over $SnO_2$. EP 0823742 describes tin mixed oxides doped with various metals. U.S. Pat. No. 5,654,114 also describes the use of tin oxides as positive-electrode material for secondary lithium ion batteries. These systems have the drawback that Li is converted into $Li_2O$. This means that a large amount of Li is bound, and therefore is not available for the electrochemical processes in the battery.

The present invention provides positive-electrode materials which offer better charging/discharging behavior compared with carbon. The better behavior is characterized by higher capacities and good cycle stability. These are achieved by the use of modified tin oxides, which are used as positive-electrode material in electrochemical cells. It has been found that doping of the tin oxide $SnO_2$ on the positive-electrode side results in an improved anode system.

Surprisingly, it has been found that the modified tin oxide systems have excellent electrochemical properties. The irreversible loss of lithium during the 1st cycle is still observed. However, it is not as pronounced as before the treatment of the tin oxide $SnO_2$.

The prior-art uses of tin oxides for positive-electrode materials have the problem of particle agglomeration. Surprisingly, it has been found that the process according to the invention enables the production of particles of defined diameter. The process according to the invention enables the production of primary particles in the nm range and larger secondary particles having a diameter of less than 10 µm. The smaller primary particles agglomerate to the larger secondary particles. These small particles result in an increase in the active surface area.

In a preferred embodiment, the process for the preparation of the positive-electrode material is characterized in that a) urea is added to a tin chloride solution, b) urotropin and a suitable doping compound are added to the solution, c) the resultant sol is emulsified in petroleum ether, d) the resultant gel is washed, and the solvent is removed by suction, e) and the gel is dried and heat-treated.

These materials are suitable for use in electrochemical cells, preferably in batteries, and particularly in secondary lithium ion batteries.

The positive-electrode material are employed in secondary lithium ion batteries with customary electrolytes. Examples of suitable electrolytes are conductive salts such as $LiPF_6$, $LiBF_4$, $LiClO_4$, $LiAsF_6$, $LiCF_3SO_3$, $LiN(CF_3SO_2)_2$ and $LiC(CF_3SO_2)_3$, and mixtures thereof. The electrolytes may also comprise organic isocyanates (DE 199 44 603) for reducing the water content. The electrolytes may also comprise organic alkali metal salts (DE 199 10 968) as additives.

Thus, suitable electrolytes contain alkali metal borates of the general formula I $$Li^+B^-(OR^1)_m(OR^2)_p \qquad I$$

in which m and p are 0, 1, 2, 3 or 4, where m+p=4, and $R^1$ and $R^2$ can be identical or different, $R^1$ and $R^2$ can be bonded directly to one another via a single or double bond, $R^1$ and $R^2$ can each be an aromatic or aliphatic carboxylic, dicarboxylic or sulfonic acid radical, or each can be an aromatic ring such as a phenyl, naphthyl, anthracenyl or phenanthrenyl ring which may be unsubstituted or mono- to tetrasubstituted by A or Hal, or each can be a heterocyclic aromatic ring such as pyridyl, pyrazyl or bipyridyl ring, which may be unsubstituted or mono- to trisubstituted by A or Hal, or each can be an aromatic hydroxy acid such as aromatic hydroxycarboxylic acids or aromatic hydroxysulfonic acids, which may be unsubstituted or mono- to tetrasubstituted by A or Hal.

Hal is halogen, e.g., F, Cl or Br and A is an alkyl group having 1 to 6 carbon atoms, which may be mono- to trihalogenated.

Likewise suitable electrolytes contain alkali metal alkoxides of the general formula II $$Li^+OR^- \qquad II$$

R can be an aromatic or aliphatic carboxylic, dicarboxylic or sulfonic acid radical, or can be an aromatic ring from the group such as a phenyl, naphthyl, anthracenyl or phenanthrenyl ring, which may be unsubstituted or mono- or tetrasubstituted by A or Hal, or can be a heterocyclic aromatic ring such as a pyridyl, pyrazyl or bipyridyl ring, which may be unsubstituted or mono- to trisubstituted by A or Hal, or can be an aromatic hydroxy acid such as aromatic hydroxycarboxylic acids or aromatic hydroxysulfonic acids, which may be unsubstituted or mono- to tetrasubstituted by A or Hal.

Hal is F, Cl or Br and A is an alkyl group having 1 to 6 carbon atoms, which may be mono- to trihalogenated.

Suitable electrolytes can also contain lithium complex salts of the formula III

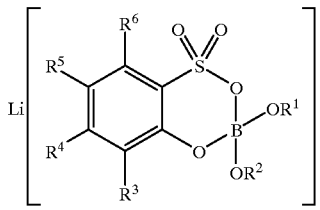

R$^1$ and R$^2$ can be identical or different, are optionally bonded directly to one another via a single or double bond, and can each be, an aromatic ring such as phenyl, naphthyl, anthracenyl and phenanthrenyl, which may be unsubstituted or mono- to hexasubstituted by alkyl (C$_1$ to C$_6$), alkoxy groups (C$_1$ to C$_6$) or halogen (F, Cl or Br), or can each be an aromatic heterocyclic ring pyridyl, pyrazyl and pyrimidyl ring, which may be unsubstituted or mono- to tetrasubstituted by alkyl (C$_1$ to C$_6$), alkoxy groups (C$_1$ to C$_6$) or halogen (F, Cl or Br), or can each be an aromatic ring such as a hydroxybenzocarboxyl, hydroxynaphthalenecarboxyl, hydroxybenzosulfonyl or hydroxynaphthalenesulfonyl ring, which may be unsubstituted or mono- to tetrasubstituted by alkyl (C$_1$ to C$_6$), alkoxy groups (C$_1$ to C$_6$) or halogen (F, Cl or Br), R$^{3-R6}$ are each independently,
1. alkyl (C$_1$ to C$_6$), alkoxy (C$_1$ to C$_6$) or halogen (F, Cl or Br) or
2. an aromatic ring such as;

a phenyl, naphthyl, anthracenyl and phenanthrenyl ring, which may be unsubstituted or mono- to hexasubstituted by alkyl (C$_1$ to C$_6$), alkoxy groups (C$_1$ to C$_6$) or halogen (F, Cl or Br), a pyridyl, pyrazyl and pyrimidyl ring, which may be unsubstituted or mono- to tetrasubstituted by alkyl (C$_1$ to C$_6$), alkoxy groups (C$_1$ to C$_6$) or halogen (F, Cl or Br), or two adjacent R$^{3-R6}$ can form: a ring in (2) above.

Complex salts of formula III are prepared by the following process (DE 199 32 317):
a) chlorosulfonic acid is added to 3-, 4-, 5- or 6-substituted phenol in a suitable solvent,
b) the product from step a) is reacted with chlorotrimethylsilane. The reaction mixture is filtered and subjected to fractional distillation,
c) the product from step b) is reacted with lithium tetramethoxyborate(1-) in a suitable solvent, and the end product is isolated therefrom.

The electrolytes may likewise comprise a compound of the following formula (DE 199 41 566):

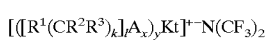        IV where

Kt=N, P, As, Sb, S or Se

A=N, P, P(O), O, S, S(O), SO$_2$, As, As(O), Sb or Sb(O)

R$^1$, R$^2$ and R$^3$ can be identical or different, and each can be

H, halogen substituted or unsubstituted alkyl C$_n$H$_{2n+1}$ group, a substituted or unsubstituted alkenyl groups having 1–18 carbon atoms and one or more double bonds, a substituted or unsubstituted alkynyl group having 1–18 carbon atoms and one or more triple bonds, a substituted or unsubstituted cycloalkyl C$_m$H$_{2m-1}$ group, a mono- or polysubstituted or unsubstituted phenyl, or a substituted or unsubstituted heteroaryl group, A can be included in various positions in R$^1$, R$^2$ or R$^3$ Kt can be included in a cyclic or heterocyclic ring, and the groups bonded to Kt may be identical or different, where n=1–18 m=3–7 k=0 or 1–6 l=1 or 2 in the case where x=1 and 1 in the case where x=0 x=0 or 1 y=1–4.

In the process for the preparation of these compounds, an alkali metal salt of the general formula $$D^+ - N(CF_3)_2 \quad (2)$$

where D$^+$ is an alkali metal, is reacted, in a polar organic solvent, with a salt of the general formula

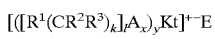        (3)

where

Kt, A, R$^1$, R$^2$, R$^3$, k, l, x and y are as defined above, and $^-$E is F$^-$, Cl$^-$, Br$^-$, I$^-$, BF$_4^-$, ClO$_4^-$, AsF$_6^-$, SbF$_6^-$ or PF$_6^-$.

Use can further be made of electrolytes comprising compounds of the general formula (DE 199 53 638)

where

X is H, F, Cl, C$_n$F$_{2n+1}$, C$_n$F$_{2n-1}$ or (SO$_2$)$_k$N(CR$^1$R$^2$R$^3$)$_2$

Y is H, F or Cl

Z is H, F or Cl

R$^1$, R$^2$ and R$^3$ are H and/or alkyl, fluoroalkyl or cycloalkyl groups m is 0–9 and, if X=H, m≠0 n is 1–9

The electrolyte can additionally be prepared by reacting partially or perfluorinated alkylsulfonyl fluorides with dimethylamine in organic solvents, and complex salts of the general formula IV (DE 199 51 804)

$$M^{x+}[EZ]_{x/y}{}^{y-} \quad V$$

in which:

x and y are 1, 2, 3, 4, 5 or 6

M$^{x+}$ is a metal ion and

E is a Lewis acid selected from the group consisting of BR$^1$R$^2$R$^3$, AlR$^1$R$^2$R$^3$, PR$^1$R$^2$R$^3$R$^4$R$^5$, AsR$^1$R$^2$R$^3$R$^4$R$^5$ and VR$^1$R$^2$R$^3$R$^4$R$^5$.

R$^1$ to R$^5$ can be identical or different, and are optionally bonded directly to one another via a single or double bond, and can each be, a halogen (F, Cl or Br), an alkyl or alkoxy radical (C$_1$ to C$_8$), which may be partially or fully substituted by F, Cl or Br, an aromatic ring, optionally bonded via oxygen, such as a phenyl, naphthyl, anthracenyl or phenanthrenyl ring, which may be unsubstituted or mono- to hexasubstituted by alkyl ($C_1$ to $C_8$) or F, Cl or Br, an aromatic heterocyclic ring, optionally bonded via oxygen, pyridyl, pyrazyl or pyrimidyl ring, which may be unsubstituted or mono- to tetrasubstituted by alkyl ($C_1$ to $C_8$) or F, Cl or Br.

Z is $OR^6$, $NR^6R^7$, $CR^6R^7R^8$, $OSO_2R^6$, $N(SO_2R^6)(SO_2R^7)$, $C(SO_2R^6)(SO_2R^7)(SO_2R^8)$ or $OCOR^6$.

$R^6$ to $R^8$ can be identical or different, and are optionally bonded directly to one another via a single or double bond and can each be, hydrogen or as defined for $R^1$ to $R^5$, The solution is prepared by reacting a corresponding boron or phosphorus Lewis acid/solvent adduct with a lithium or tetraalkylammonium imide, methanide or triflate.

An additional suitable electrolyte is borate salts (DE 199 59 722) of formula VI

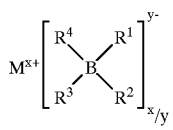

VI in which:

M is a metal ion or tetraalkylammonium ion, and x and y are 1, 2, 3, 4, 5 or 6, $R^1$ to $R^4$ can be identical or different and are alkoxy or carboxyl radicals ($C_1$–$C_8$), which are optionally bonded directly to one another via a single or double bond.

These borate salts are prepared by reacting lithium tetraalkoxyborate or a 1:1 mixture of lithium alkoxide and a borate with a suitable hydroxyl or carboxyl compound in a ratio of 2:1 or 4:1 in an aprotic solvent.

The positive-electrode materials according to the invention can likewise be employed in systems with polymer-coated lithium mixed oxide particles for negative-electrode materials (DE 19946066). The process for the production of lithium mixed oxide particles coated with one or more polymers is characterized in that the particles are suspended in a solvent, and the coated particles are then filtered off, dried and, if desired, calcined. Further, the positive-electrode materials according to the invention can also be employed in systems with negative electrodes consisting of lithium mixed oxide particles coated with one or more metal oxides (DE 19922522). The process for the production of lithium mixed oxide particles coated with one or more metal oxides is characterized in that the particles are suspended in an organic solvent, a solution of a hydrolysable metal compound and a hydrolysis solution are added to the suspension, and the coated particles are then filtered off, dried and, if desired, calcined.

A preferred embodiment of the invention is explained in greater detail below.

The starting compound employed is a 1–2 molar, preferably 2 molar, tin tetrachloride solution. This solution prepared by introducing tin tetrachloride into water with cooling and vigorous stirring. A white precipitate which is formed in the Sn system is dissolved by warming. The mixture is cooled to room temperature. Then, the amount of urea corresponding to the system is added and dissolved completely.

The doping is carried out on the anion side of the tin compound, i.e. $SnO_{2-x}Y_x$, where Y is an element such as F, Cl, Br, I, S, Se, Te, B, N or P. The tin oxide is doped with anions which replace oxygen. The anion is produced by adding the corresponding amount of the doping substance in solid or liquid form to the solution. Organic or inorganic salts are typically used. In this embodiment, $NH_4F$ is added. However, LiF, NaF or other inorganic or organic fluorides can be added. The concentration of the doping substance is preferably in the range of about 1 to about 20% by weight based on the total weight of the tin compound, and more preferably in the range of about 5 to about 15%.

Through addition of water, the dissolved concentration of the solution, 1–2 molar tin tetrachloride, is adjusted. The solution is cooled e.g., to temperatures between about 0 and about 10° C., preferably to 5–7° C. A 3.0–4.0 molar, and preferably 3.5 molar, hexamethylenetetramine solution is added in the preferred ratio 1:1. A 10% sub- or super-stoichiometric amount of hexamethylenetetramine can also be used. The mixture is stirred until the solution is clear.

A sufficient amount of benzine (petroleum ether) is mixed with from about 0.5 to about 1.5%, preferably 0.7%, commercially available emulsifiers. Preferably the emulsifier is Span 80. This solution is warmed to a temperature between about 30° C. and about 70° C., preferably to about 50° C. At this juncture, the solution described above is added to the pet ether solution with constant stirring. An ammonia solution is added to the forming gel after 3 to 20 minutes, and preferably after 10 minutes, and the pH is stabilized so that no peptization of the gel occurs.

The organic phase is decanted, and the gel is washed with a suitable organic solvent, preferably with petroleum ether. To remove the emulsifier and organic impurities, at least one detergent, preferably Triton, is then added to the solution. The solution is filtered with suction, and the remaining gel is washed with water and acetone.

The gel is dried and, if desired, subjected to heat treatment. If an SnO system is desired, drying to a maximum of about 230° C., preferably at from about 75° C. to about 110° C., is sufficient. If an $SnO_2$ system is desired, the drying is followed a heat treatment which is carried out at a temperature between about 230° C. and about 500° C., and preferably between 255° C. and 350° C., particularly about at about 350° C. The heat treatment is carried out for between 10 minutes and about 5 hours, preferably between about 90 minutes and about 3 hours, particularly for about 2 hours. Other mixed oxides (e.g., a $SnO/SnO_2$ mixed system) can be produced by variations of this process.

The entire disclosure of all applications, patents and publications, cited above and below, and of corresponding German application DE100 25 761.5, are hereby incorporated by reference.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

EXAMPLES

Example 1

Sol-gel Synthesis
Solution 1

250 ml of water are introduced into a four-necked flask with stirrer. 235 ml of $SnCl_4$ are added dropwise over the course of 90 minutes with vigorous stirring (350 rpm) and cooling with ice. A white precipitate forms which begins to dissolve by warming of the solution. The solution is warmed for 60 minutes and the warming is terminated after the precipitate has dissolved completely and the boiling point of the solution (122° C.) has been reached. The mixture is cooled to room temperature, and 600 g of urea are introduced and dissolved completely. The endothermic dissolution process results in a clear, high-viscosity solution, which is made up to one liter of solution with water.

Example 2

Solution 2

490 g of urotropin (hexamethylenetetramine=HMT) are dissolved in 600 ml of water in a beaker on a magnetic stirrer. When the slightly exothermic dissolution is complete, if one liter of slightly greenish, cloudy solution is present. 38.5 ml of solution 1 (0.077 mol=11.6 g of $SnO_2$) and 2 g of ammonium fluoride are pre-cooled in an ice bath for 4 minutes in a 250 ml beaker. 22 ml of solution 2 (0.077 mol) are added, and the mixture is stirred at 50° C. and 350 rpm (double-blade stirrer, 4 cm) for 3 minutes until the solution is clear.

Example 3

Emulsion Formation 400 ml of benzine are added to 2.0 g of Span 80 (=0.74%) in a 1 liter beaker and mixed at 350 rpm. The temperature is adjusted to 50° C. by means of a water bath. The freshly prepared mixture described in Example 2 is added and emulsified at 400 rpm. After about 1.5 minutes, the gel forms.

After 10 minutes, 10 ml of 1% ammonia is added. The mixture is emulsified at 400 rpm for a further 6 minutes.

Example 4

Phase Separation and Extraction

The organic benzine phase is decanted, washed with 2×35 ml of petroleum ether and separated.

To remove the emulsifier, the gel is mixed with 30 ml of Triton solution (concentration of the Triton solution can be matched to the system) and slurried for 6 minutes in the beaker. The mixture is filtered off via a suction filter and washed with 200 ml of water. The residue is covered with acetone and filtered with suction for precisely 15 minutes.

Example 5

Drying and Heat Treatment

The product is dried in air for one day and in a drying cabinet for one day at 60° C.

Results

Appearance before the heat treatment:

whitish transparent uniform beads

Heat treatment: program: 20° C.→180 min→350° C./120 min→20° C. Appearance alter the heat treatment: virtually unchanged SEM studies show spherical particles.

The measured capacity of the positive electrode consisting of an $SnO_{2-x}Y_x$ system doped with fluoride is still a remarkable 500 mAh/g after the 3rd cycle.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An electrode containing a positive electrode material, wherein the positive electrode material is tin oxide doped with F, Cl, Br, I, S, Se, Te, B, N or P anions.

2. An electrode according to claim 1, wherein the dopants are present in an amount of 1 to 20% by weight, based on the total weight of the tin compound.

3. An electrode according to claim 1, wherein the dopants are present in an amount of 5 to 15% by weight, based on the total weight of the tin compound.

4. A process for the preparation of the positive-electrode material of claim 1 comprising:

adding urea to a tin chloride solution, adding urotropin and a doping compound to the solution, emulsifying a resultant solution in petroleum ether, washing a resultant gel, and removing solvent by suction, and optionally drying and heat-treating the gel.

5. An electrochemical cell comprising:

a positive electrode, wherein the positive electrode is a material according to claim 1.

6. An electrochemical cell according to claim 5, further comprising:

a negative electrode, a separator, and an electrolyte.

7. An electrochemical cell, a battery or a secondary lithium battery, comprising a positive electrode material, wherein the positive-electrode material is the positive electrode material of claim 1.

8. An electrode according to claim 1, wherein the positive electrode material further comprises primary particles having a diameter in the nm range, and secondary particles having a diameter of less than 10 $\mu$m, wherein the secondary particles are distinctly larger than the primary particles, and wherein the primary particles agglomerate to the secondary particles.

9. A process for the production of a positive electrode material, comprising emulsifying a solution of urea and tin chloride to which urotropin and a doping compound have been added.

10. A process according to claim 9, where the doping compound is one supplying F, Cl, Br, I, S, Se, Te, B, N or P anions.

* * * * *